United States Patent
Randal

(10) Patent No.: US 9,809,478 B2
(45) Date of Patent: Nov. 7, 2017

(54) RECYCLING AND TREATMENT PROCESS FOR PRODUCED AND USED FLOWBACK FRACTURING WATER

(75) Inventor: Chad Allen Randal, Cochrane (CA)

(73) Assignee: Amperage Energy Inc., Cochrane, AB (CA)

(*) Notice: Subject to any disclaimer, the term of this patent is extended or adjusted under 35 U.S.C. 154(b) by 865 days.

(21) Appl. No.: 12/832,662

(22) Filed: Jul. 8, 2010

(65) Prior Publication Data
US 2011/0005999 A1  Jan. 13, 2011

Related U.S. Application Data

(60) Provisional application No. 61/223,904, filed on Jul. 8, 2009.

(51) Int. Cl.
| | | |
|---|---|---|
| C02F 1/00 | (2006.01) | |
| C02F 9/00 | (2006.01) | |
| C02F 1/32 | (2006.01) | |
| C02F 1/44 | (2006.01) | |
| C02F 1/72 | (2006.01) | |
| C02F 103/18 | (2006.01) | |

(52) U.S. Cl.
CPC .......... *C02F 9/00* (2013.01); *C02F 1/32* (2013.01); *C02F 1/44* (2013.01); *C02F 1/72* (2013.01); *C02F 2103/18* (2013.01); *C02F 2201/008* (2013.01)

(58) Field of Classification Search
None
See application file for complete search history.

(56) References Cited

U.S. PATENT DOCUMENTS

| | | | | |
|---|---|---|---|---|
| 3,581,897 | A * | 6/1971 | Eggert | 210/199 |
| 3,672,512 | A * | 6/1972 | Werner | 210/523 |
| 3,719,026 | A * | 3/1973 | Sand | 95/106 |
| 4,076,615 | A * | 2/1978 | Olesen et al. | 210/616 |
| 4,853,002 | A * | 8/1989 | Niedzwiecki et al. | 95/9 |
| 5,282,877 | A * | 2/1994 | Unger et al. | 55/484 |
| 5,453,179 | A * | 9/1995 | Stultz | 210/97 |
| 6,569,338 | B1 * | 5/2003 | Ozyboyd | 210/624 |
| 2004/0112836 | A1 * | 6/2004 | Manz et al. | 210/721 |
| 2005/0139530 | A1 * | 6/2005 | Heiss | 210/85 |
| 2006/0006114 | A1 * | 1/2006 | Deskins | 210/724 |
| 2008/0156709 | A1 * | 7/2008 | Johnson | 210/106 |

OTHER PUBLICATIONS

Randal, C., "Recycling and Treatment Process for Produced and Used Flowback Fracturing Water", U.S. Appl. No. 61/223,904, filed on Jul. 8, 2009, 14 pages.

* cited by examiner

*Primary Examiner* — Richard Gurtowski
(74) *Attorney, Agent, or Firm* — Cesari and McKenna, LLP; Omar M. Wadhwa

(57) ABSTRACT

A portable water recycling and treatment system and process for used and produced flowback frac water pumps the water from a collection tank through a series of dedicated hydration, retention and filtering tanks and vessels that provide treatment for the removal of chemicals, sediments and other containments. The system, which is enclosed, can be readily assembled on-site by interconnecting the dedicated tanks, vessels and pumps. The tanks and vessels may be situated in a plurality of trailers/units that are transported separately to the site.

22 Claims, 5 Drawing Sheets

RECYCLING AND TREATMENT PROCESS FOR PRODUCED AND USED FLOWBACK FRACTURING WATER

CROSS REFERENCE TO RELATED APPLICATION

This application claims the benefit of U.S. Provisional Patent Application Ser. No. 61/223,904, titled RECYLING AND TREATMENT PROCESS FOR PRODUCED AND USED FLOWBACK FRACTURING WATER, which was filed on Jul. 8, 2009 by Chad Randal, the contents of which are incorporated herein in its entirety.

BACKGROUND OF THE INVENTION

Field of the Invention

The invention relates generally to water recycling systems and, more particularly, to water recycling systems for use with water that is produced and used in well fracturing or stimulation.

Background Information

Water used and produced in oil and gas well fracturing, or stimulation, operations requires treatment before re-use and disposal. The water is treated to remove chemicals that were added to the water before use and/or chemicals and sediment present in the water after use as a by-product of the well stimulation. The water, commonly referred to as used flowback fracturing ("frac") water and produced water, may have been processed to ensure that it is capable of being used initially for stimulating oil and gas wells and is again processed for that purpose. In addition, the water is processed for disposal, e.g., to prevent contamination of ground water resources.

The water treatment facilities must be capable of treating the water for wide ranges of conditions including total dissolved solids, turbidity, different types and concentration of contaminants, off-gassing, and so forth. Thus, the water treatment facilities are generally complex and costly to build and operate.

Typically, large quantities of the used flowback frac water and produced water are pumped into trucks and transported from the well site to the water treatment and/or disposal facilities and, for re-use, transported back to the well site. Accordingly, traffic to and from the exploration areas is increased. When water re-use is not feasible because of, for example, the economics of transporting the water back to the well site after treatment, the demands on local water resources can be enormous and may adversely affect the availability of ground waters for other purposes.

What is needed is a portable water recycling system and process that can be established and run at or near a well site.

SUMMARY OF THE INVENTION

A portable water recycling and treatment system and process for used and produced flowback frac water pumps the water from a collection tank through a series of dedicated hydration, retention and filtering tanks and vessels that provide treatment for the removal of chemicals, sediments and other containments. The system, which is enclosed, can be readily assembled on-site by interconnecting the dedicated tanks, vessels and pumps. The tanks and vessels may be situated in a plurality of trailers/units that are transported separately to the site. The operations of the respective tanks and vessels are discussed in more detail below.

The system and process are to be used for the treatment of oilfield waste waters, flowback frac waters, oilfield produced waters, and any type of water requiring pretreatment for use in fracturing service or for preconditioning of waste waters to meet a potable water specification. However, the system and process are not limited to water type, and may also be used for the treatment of high salinity waters that require pretreatment and reduction of salinity via chemistry additions and retention prior to treatment using membrane type technologies or other chemistries.

BRIEF DESCRIPTION OF THE DRAWINGS

The invention description below refers to the accompanying drawings, of which.

DETAILED DESCRIPTION OF AN ILLUSTRATIVE EMBODIMENT

A portable water recycling and treatment system and process are described below for use in the oil and gas service industry, though the system and process are not limited to such use. In particular, in the illustrative embodiment, a system and process are described for treating contaminated flowback fracturing water used or produced at a well site.

Figure 1:
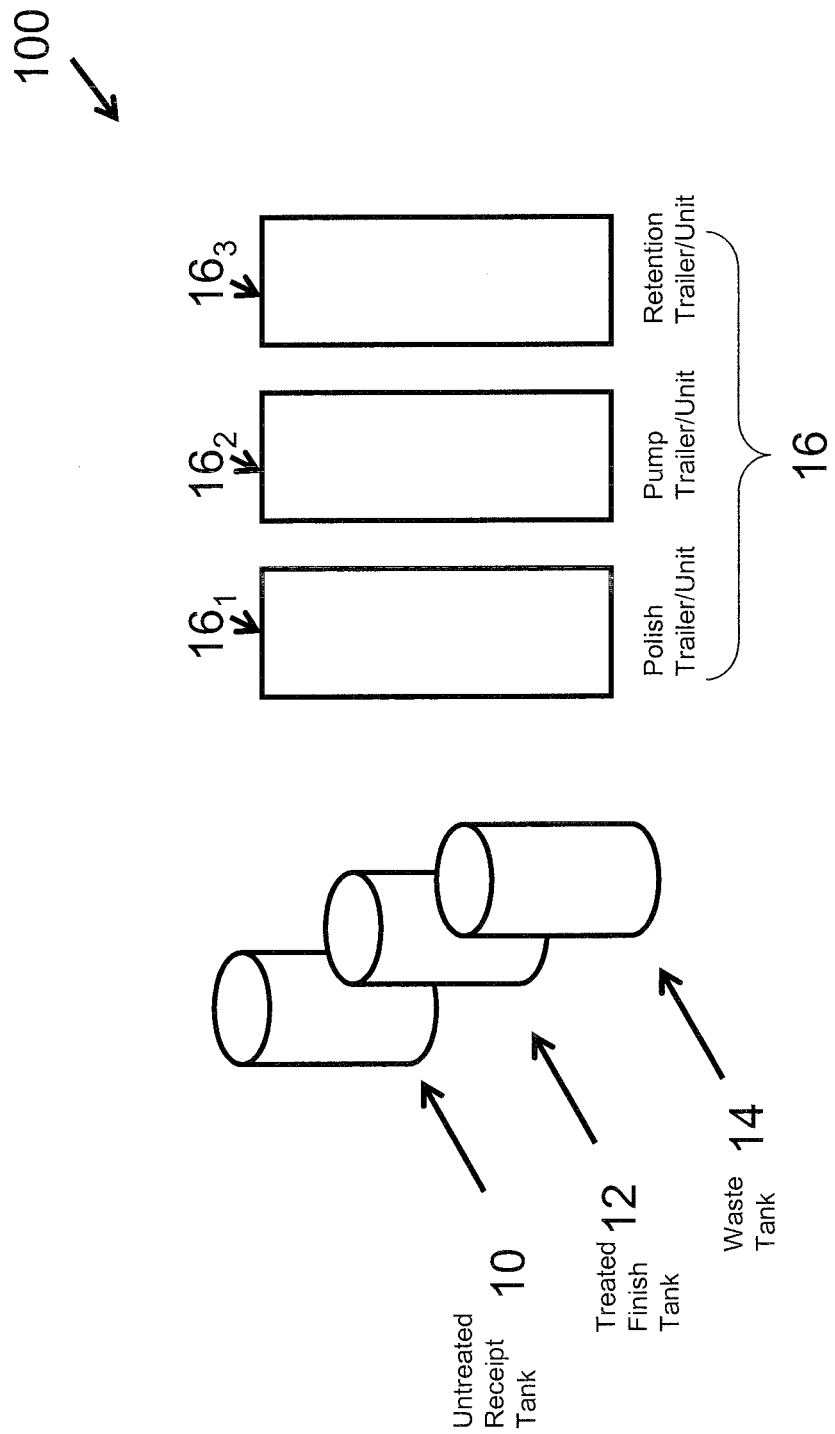
FIGS. 1 and 2 are overviews of the system and process.

Referring now to FIG. 1, a portable water recycling and treatment system 100 includes an untreated water receipt tank 10, a treated water finish tank 12, and a waste tank 14, generally established at or near (proximate to) the well site. According to the illustrative embodiments described in more detail below, the system receives the contaminated flowback fracturing water from the well site at the untreated water receipt tank, processes the water, and transports any residual materials resulting from the treatment processes (such as, e.g., chemicals, contaminates, solids, flocculants, coagulants, gases, particulates, and microbes) to the waste tank. Treated water may then be supplied to the treated water finish tank for either re-use at the well site or further transportation away from the site (e.g., for further processing or disposal).

Figure 2:
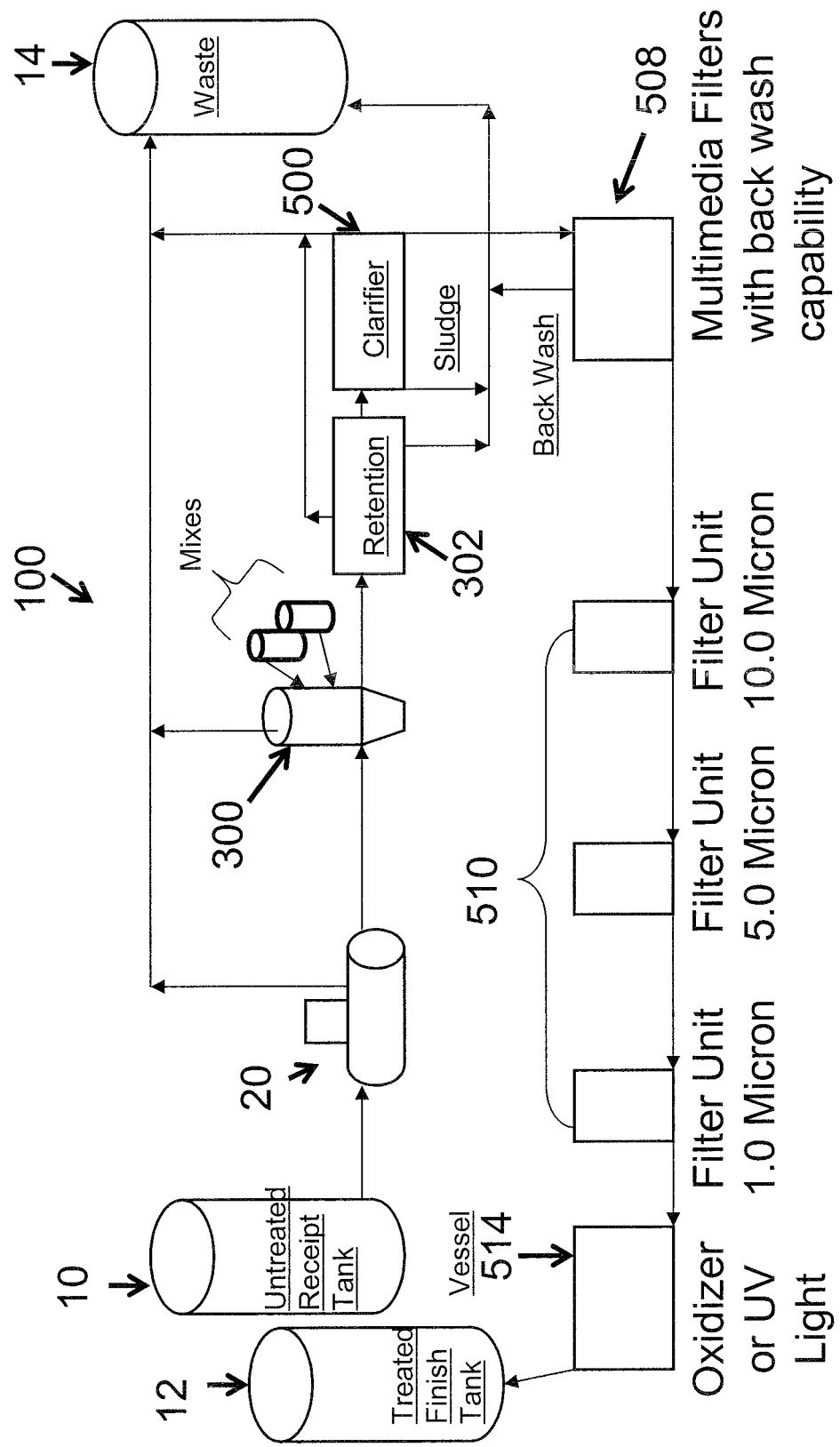

The portable water recycling and treatment system 100 also includes and a plurality of portable and configurable containers, e.g., wheeled semi trailers/-units, $16_1$, $16_2$, and $16_3$, referred to collectively by reference numeral 16, that contain dedicated tanks and vessels and associated pumps as discussed below with reference to FIGS. 2-5, generally referred to as a pump subsystem and a treatment subsystem, depending on functionality (rather than physical orientation). The trailers/units may be transported to a location proximate to the well site, interconnected on-site with the tanks to complete the system, which is a fully enclosed system that effectively handles fluid, solid, and gas waste. The drawing depicts three trailers/units, one each for a pump subsystem, retention subsystem, and polish subsystem, however, the system may be constructed on fewer or more trailers/units, as appropriate, and respective sub-system operations may be performed on single or multiple trailers/units. For ease of explanation, the three sub-systems are depicted in more detail in FIGS. 3-5 and an overview of the system is depicted in FIG. 2.

Generally speaking, and as described in detail below, the pump subsystem and treatment subsystem are selectively configurable to pump and treat water based on one or more characteristics of the contaminated water at the particular site, one or more desired characteristics of treated water output from the containers, and a volume of water to be treated. The selective configuration may be accomplished through varying control parameters, activating certain features, and making certain interconnections (e.g., via the pump subsystem).

In other words, the interconnections basically consist of connecting the untreated water receipt tank to the treatment subsystem, and the treatment subsystem to the treated water finish tank and waste tank, such that operation of the subsystems to treat the untreated water (treatment processes) pumps the untreated water of the receipt tank through the treatment subsystem, resulting in treated water entering the treated water finish tank and residual materials entering the waste tank. At the same time, however, the pump subsystem and treatment subsystem may be adjusted at the well site to accommodate various conditions, or may be initially configured (e.g., prior to transport to the site) to account for expected conditions. For example, as described herein, various treatment processes (and interconnections) may be selectively adjusted (and/or omitted) based the input water or output water characteristics, how much water is to be treated, at what rate, at what temperature, etc.

Referring now to FIGS. 1-5, the system 100 takes contaminated flowback fracturing water collected in the untreated water receipt tank 10, which in the example is a 400 bbl collection tank, and pumps the water for treatment through a pump sub-system operating on the pump trailer/unit $16_2$ to a hydration tank 300 or 301 on the pump trailer/unit $16_2$ or retention trailer/unit $16_3$. As the water is pumped between the collection tank and the hydration tank, chemical add from one or more chemical tanks 202 may be supplied via chemical pumps 210 to chemically treat the water (at vessel 20). The chemical add and water may be mixed in the hydration tank by a paddle type assembly (not shown) or with in line mixers. In addition, a vacuum unit (e.g., chamber) 512 may be added into the system and process, to strip any entrained light hydrocarbons, $N_2$ or $CO_2$ or methanol and $H_2S$ out of the water at conditions of up to and over 4.3 psia vacuum and temperatures up to 70 Celsius. The released gases that are vacuumed may be sent to the waste tank or other storage or treatment facility, or, where appropriate, released into the atmosphere.

The water next passes from the hydration tank 300 through a hopper 301 for further mixing and hydration of an $H_2S$ (hydrogen sulfide) scavenger, oxidizers, coagulants, or flocculants in the water, to one or more larger tiered retention vessels 302 on the retention trailer/unit $16_3$. The retention vessels allow the settling of the chemical add, which may consist of various flocculants and coagulants and other chemicals used to scavenge out $H_2S$ and residual pumping industry chemistry, as well as other classified contaminants targeted for removal. The water is flowed through the sludge concentration in the bottom of the retention vessels or showered down on top of the settling water, depending on flocculant used, to remove contaminants including solids and total dissolved solids ("TDS"), as appropriate. The residual contaminants (e.g., settled chemicals or contaminates) are periodically siphoned off from the retention vessels 302 to the waste tank 14 by the pumping sub-system, and gases are vented to the waste tank and/or an $H_2S$ scrubber attached to waste tank 14 in FIG. 1. The water may then be decanted from the retention vessels through a dump tank 304, that also provides to the waste tank 14 any residual waste that can be skimmed from the water and transported to the waste tank.

Notably, at whichever configured stage where chemicals may be added to the water, a type, an amount, or a mixture of chemicals to be added may be adjusted (e.g., dynamically by a control subsystem) based on various factors. Such factors may comprise the characteristics of the contaminated water, the desired characteristics of treated water output, the volume of water to be treated, and a temperature of the water (e.g., adding methanol to keep the water from freezing in the winter or cold climates). For example, certain chemicals may be added to the water to treat the water as may be understood by those skilled in the art, such as oxidizers, coagulants, flocculants, $H_2S$ scavenging chemicals, methanol, and various mixtures of chemicals as appropriate.

Figure 5:
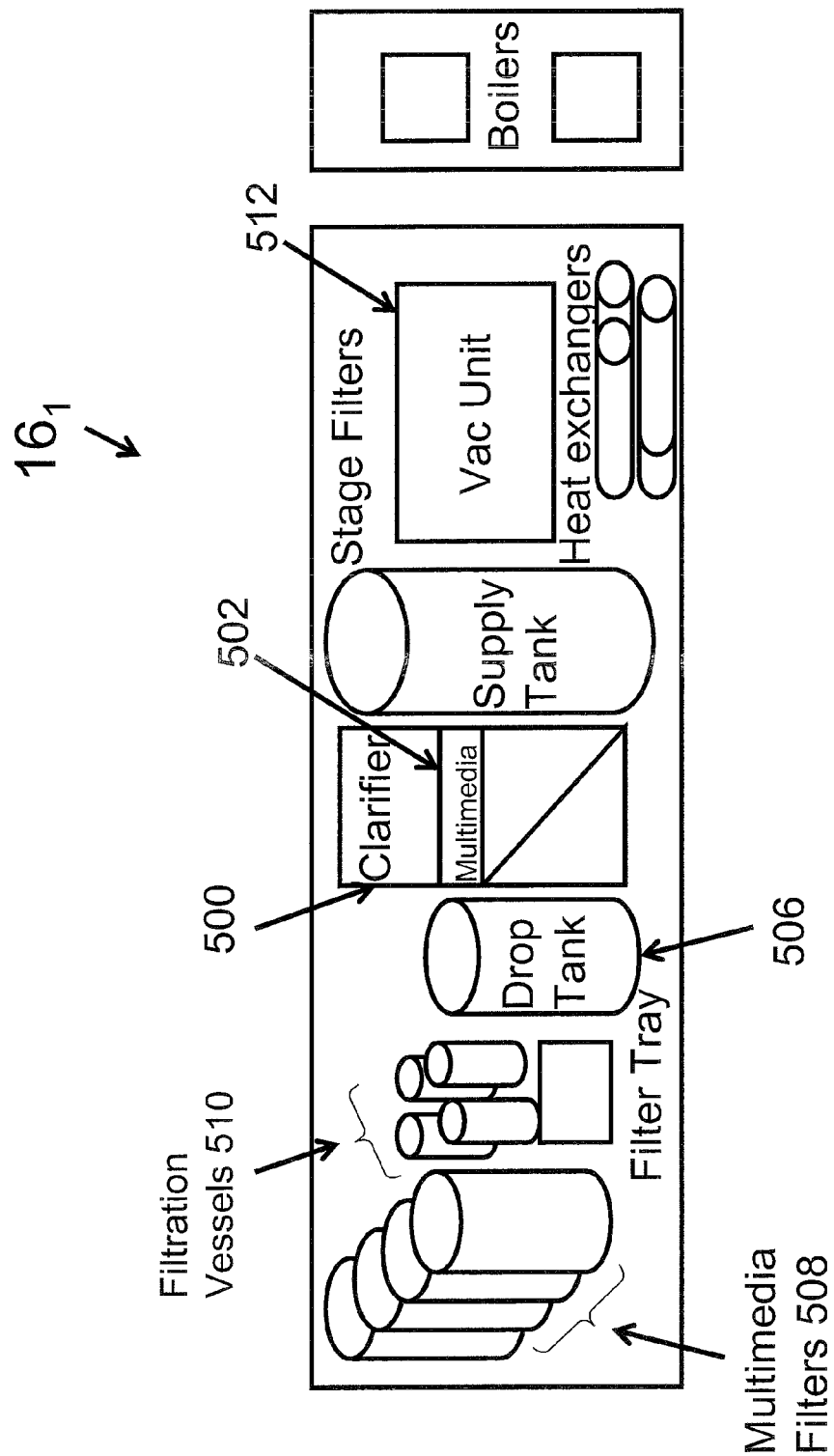
FIG. 5 is a functional block diagram of a polishing sub-system and process.

Referring now also to FIG. 5 (polish trailer/unit $16_1$), the water is pumped from the dump tank 304 through a clarifier 500 that is packed with multimedia material 502 that is laid inside the vessel or tank at angles designed to optimize surface contact for water and prevent contaminant build up in the media that may plug the clarifier. Essentially, clarified water passes to the surface, gas breaks out (is released) and is vented to the waste tank 14, and solids and carry over flocculant drop out to the bottom of the vessel for further removal to the waste tank as sludge. The clarified water is then provided to a drop/catch tank 506 that builds retention volume.

Next, the water is pumped through a series of back wash capable multimedia filters 508 that are packed with media (e.g., a polyelectrolyte) that attracts additional particles that may have been carried over from the clarification process. The waste from the filter process is supplied to the waste tank 14, while the filtered water next passes through a series of staged filtration vessels 510 (e.g., polish filters housings) that have filtration capability to filter the water down to 1 micron absolute. The staged filtration vessels operate as a high pressure filter bag assembly that is illustratively sized at over 10 times the required processing rates, and can operate over a range from 50 microns to 1 micron absolute, as appropriate, to condition the water for re-use or disposal. As shown, the filtration vessels provide 10, 5 and 1 micron polishes, though other polishes may be utilized in addition or in the alternative. The process rates in the example run up to 60 $m^3$/hr. Further, a vessel 514 for light purification (e.g., germicidal UV light or otherwise) may be included, to kill microbes that may be present in the water. The treated water, which is suitable for either re-use or disposal, is then supplied to a treated water finish tank 12.

When filtering particulates from the water, one or more filtering properties (e.g., media, polish levels, etc.) may be adjusted based on the characteristics of the contaminated water and the desired characteristics of treated water output. For instance, such characteristics may correspond to contaminate particle sizes in the contaminated water, total dissolved solid (TDS) size in the contaminated water, contaminate particle sizes in the treated water, and TDS size in the treated water.

Figure 3:
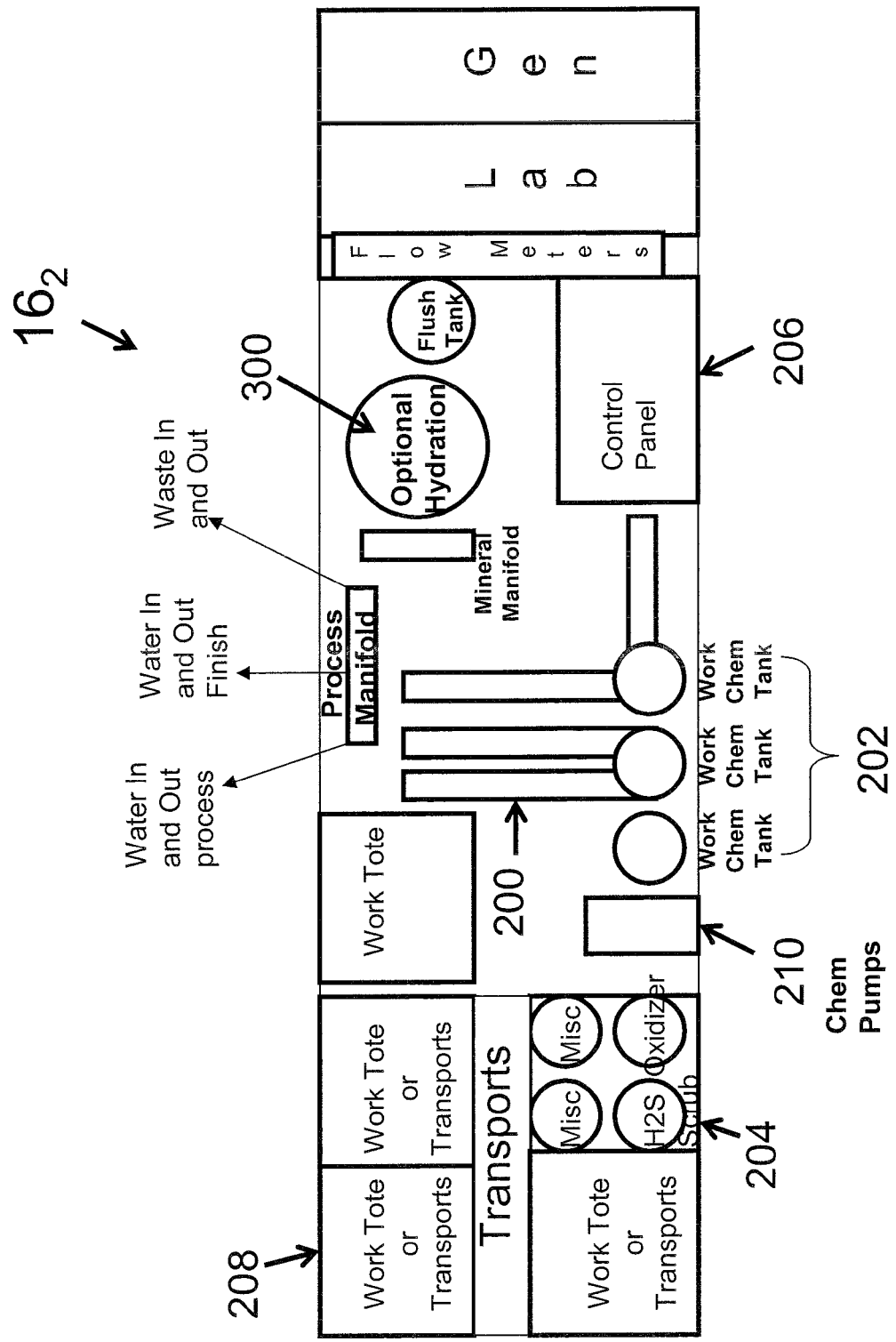
FIG. 3 is a functional block diagram of a pumping sub-system and process.
Figure 4:
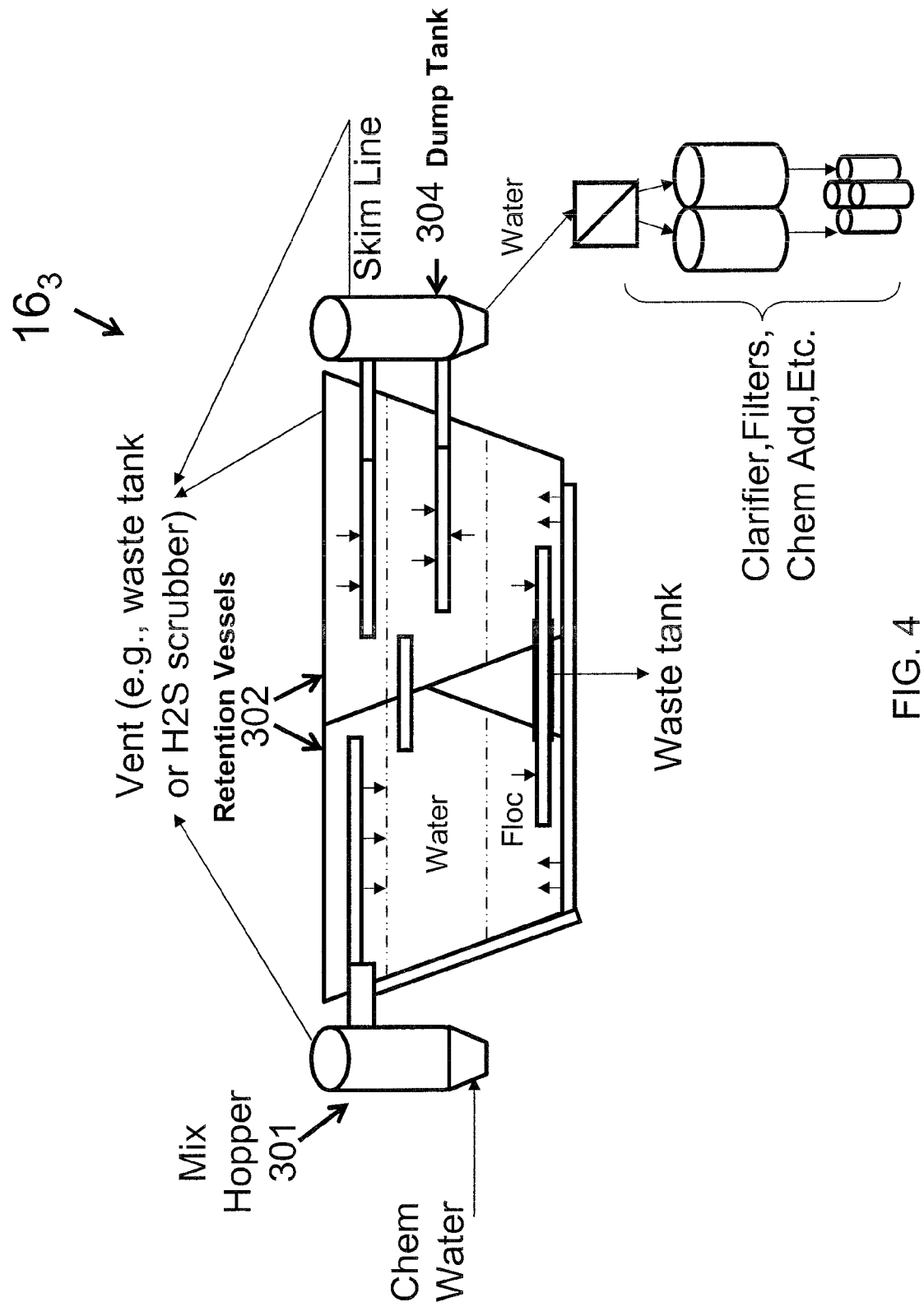
FIG. 4 is a functional block diagram of a retention sub-system and process.

The timing of the various process steps, such as mixing and hydration processes, are controlled through a control panel 206 (e.g., control subsystem), and specific reaction times associated with various chemical adds can be readily accommodated. Accordingly, the chemical adds can be varied based on the condition of the water (e.g., types of contaminates) at the start and the use to which the water is to be directed after treatment. In other words, a variable time that a volume of water remains in a particular component (vessel) may be adjusted based on the characteristics of the contaminated water and the desired characteristics of treated water output, and/or based on solids or gases to be removed from the contaminated water. As shown in FIG. 3, additional or alternative chemicals may be stored in work totes 208 and pumped into the chemical work tanks 202, by pumps 210, for use in water treatment as needed.

The system and process 100 described above are highly flexible and can be used to treat water of varying qualities, from high to low TDS, and/or various levels of hydrocarbon and water chemistry contaminants, and so forth. The onsite configuration of equipment also allows variable volumes of water to be treated on an economic commercial scale. The system and process can be run at temporary or permanent centralized locations or on a well site, where the produced and back flow frac water is flowing back to the surface.

Additionally, the pump subsystem and treatment subsystem may be adjusted based on whether the treated finish tank water is reused at the site or transported away from the well site (e.g., disposed to a location away from the site). For example, whether the water is to be reused for well operations, disposed of, or further treated away from the site, the system 100 may be configured to produce appropriate water at the treated water finish tank.

Advantageously, the portable water recycling and treatment system and process described herein may be used to efficiently treat contaminated flowback fracturing water used or produced at a well site (or other suitable water treatment locations). In particular, by allowing the pump subsystem and treatment subsystem to be selectively configurable based on characteristics of the contaminated water input and/or output at the particular site, a portable water recycling system and process that can be established and run at or near a well site is effectively provided.

For instance, as noted above, the portable system has variable water chemistry treatment add capability and allows for variable mix and hydration times of the chemicals, to satisfy specific reaction times. The system further has a retention capability for varied chemical reactions and treatment of particulates, fines or solids measured in increments of NT or turbidity from 0-1000 ppm.

The system and process are also capable of utilizing concentration techniques and reactions of effective sludge beds that are used as part of the treatment process, via by-products and from chemical treatment such as varied amounts and/or types of water flocculants. The system is essentially an enclosed system, and has the capability to handle potential off gas associated with the water, such as $CO_2$, N2, $H_2S$ and C1-C7 light carbon chains in varying concentrations.

Moreover, the clarification process allows high surface area filtration with inclined fixed media and long contact time, and the follow-on polishing steps have reduced backwash frequency through the multimedia filters. The filtration capability is able to handle high levels of iron removal, by various methods of multimedia filtration that allow the water to then be gelled and crosslinked once the iron and other contaminants are removed.

Further, the system and process thus provide a consistent water quality that is suitable for reuse of the water for well stimulation or for disposal. The system and process further reduces the solids and TDS content and fines picked up during the flowback process to levels that allow economic filtration and purification processes to be used post treatment.

The foregoing description has been directed to specific embodiments. It will be apparent, however, that other variations and modifications may be made to the described embodiments, with the attainment of some or all of their advantages. For instance, it is expressly contemplated that the components and/or elements described herein can be used for water treatment other than flowback fractured well site water. Also, while a particular order of particular treatment processes have been shown and described, those skilled in the art will appreciate that other process orders, arrangements, orientations, etc., may be used to treat water, and that the system described herein is merely an illustrative embodiment. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for use with treating contaminated flowback fracturing water used or produced at a well site, the method comprising:

establishing, proximate to the well site, a treated water finish tank, a waste tank, and an untreated water receipt tank to receive the contaminated water from the well site;

transporting one or more portable and configurable containers proximate to the well site, the containers comprising at least a pump subsystem and a treatment subsystem;

receiving, at a control subsystem, one or more control parameters indicative of at least one of: (1) one or more characteristics of the contaminated water at the well site, (2) one or more desired characteristics of treated water output from the containers, and (3) a volume of water to be treated;

interconnecting, via the pump subsystem, the receipt tank to the treatment subsystem, and the treatment subsystem to the finish tank and waste tank; and operating the subsystems to treat the contaminated water, wherein the contaminated water of the receipt tank is pumped by the pump subsystem through the treatment subsystem, in which at least an oxidizer and a coagulant are added to the contaminated water to scavenge out residual pumping industry chemistry, and pumping water through a hydration tank, then a hopper, and then from the hopper directly into a tiered retention vessel having a flat bottom wall, the tiered retention vessel configured to settle the oxidizer, the coagulant and the scavenged residual pumping industry chemistry, resulting in the treated water entering the finish tank and residual materials entering the waste tank; and adjusting (1) a selection of one or more selected types of chemicals of a plurality of different types of chemicals to be added to the contaminated water based on the one or more control parameters, (2) an amount of the selected types of chemicals to be added to the contaminated water based on the one or more control parameters, and (3) a mixture of the selected types of chemicals to be added to the contaminated water based on the one or more control parameters.

2. The method as in claim 1, wherein the subsystems comprise one or more components, the method further comprising:

adjusting a variable time a volume of water remains in a particular component based on the one or more characteristics of the contaminated water and the one or more desired characteristics of treated water output.

3. The method as in claim 2, wherein the variable time is adjusted based on at least one of either solids or gases to be removed from the contaminated water.

4. The method as in claim 1, wherein the chemicals added are selected from a group consisting of: $H_2S$ scavenging chemicals, methanol, and a mixture of chemicals of the group.

5. The method as in claim 1, further comprising:
filtering particulates from the contaminated water with one or more filters; and
adjusting a filtering property of one or more of the filters based on the characteristics of the contaminated water and the desired characteristics of treated water output.

6. The method as in claim 5, wherein the characteristics of the contaminated water and the desired characteristics of treated water output upon which the filtering property is based correspond to at least one of either contaminate particle sizes in the contaminated water, total dissolved solid (TDS) size in the contaminated water, contaminate particle sizes in the treated water, and TDS size in the treated water.

7. The method as in claim 1, further comprising:
adjusting the pump subsystem and treatment subsystem based on one or more types of contaminates in the contaminated water.

8. The method as in claim 1, further comprising:
adjusting the pump subsystem and treatment subsystem based on whether the treated water is reused at the site or transported away from the site.

9. The method as in claim 8, further comprising:
adjusting the pump subsystem and treatment subsystem for when the treated water is transported away from the site based on a further treatment to be applied to the treated water away from the site.

10. The method as in claim 1, further comprising:
siphoning, by the treatment subsystem, $H_2S$ from the contaminated water during operation.

11. The method as in claim 1, further comprising:
adjusting the pump subsystem and treatment subsystem while the one or more containers are located proximate to the well site.

12. The method as in claim 1, further comprising
allowing the contaminated water and any chemicals and contaminates to settle and any gases in the contaminated water to release,
siphoning any settled chemicals or settled contaminates, and
clarifying the contaminated water through a clarifier packed with multimedia material to remove any solids, remove any flocculants, and release gases in the contaminated water.

13. The method of claim 12 further comprising vacuuming the released gas to the waste tank.

14. The method of claim 1 further comprising treating the contaminated water with ultraviolet light.

15. The method of claim 1 further comprising mixing the oxidizer and the coagulant with the contaminated water in the hydration tank.

16. The method of claim 1 further comprising mixing the oxidizer and the coagulant with the contaminated water in the hopper to create a solution and hydrating the solution in the hopper.

17. The method of claim 1 further comprising:
settling a solution in the tiered retention vessel, wherein the solution comprises a mixture of the contaminated water, the oxidizer and the coagulant;
siphoning off residual contaminants in the tiered retention vessel;
venting gases in the tiered retention vessel to the waste tank, or an $H_2S$ scrubber, or both the waste tank and the $H_2S$ scrubber; and
decanting water from the retention vessel.

18. The method of claim 1 further comprising:
mixing the oxidizer and the coagulant with the contaminated water in the hydration tank to create a solution;
mixing the solution in the hopper;
settling the solution in the tiered retention vessel;
siphoning off residual contaminants in the tiered retention vessel;
venting gases in the tiered retention vessel; and
decanting water from the tiered retention vessel.

19. The method of claim 1 further comprising adding a flocculant to the contaminated water to scavenge out residual pumping industry chemistry and the tiered retention vessel further configured to settle the flocculant.

20. A method for removing residual pumping industry chemistry from contaminated flowback fracturing water comprising:
establishing, proximate to a well site, a treated water finish tank, a waste tank, and an untreated water receipt tank to receive the contaminated flowback fracturing water from the well site;
transporting one or more portable and configurable containers proximate to the well site, the containers comprising at least a pump subsystem and a treatment subsystem;
selectively configuring the pump subsystem and the treatment subsystem to pump and treat the contaminated water based on receiving one or more control parameters indicative of at least one of: (1) one or more characteristics of the contaminated water at the well site, (2) one or more desired characteristics of treated water output from the containers, (3) a volume of water to be treated, and (4) a temperature of the contaminated water to be treated;
interconnecting, via the pump subsystem, the receipt tank to the treatment subsystem, and the treatment subsystem to the finish tank and waste tank;
operating the subsystems to treat the contaminated water, wherein the contaminated water of the receipt tank is pumped by the pump subsystem through the treatment subsystem, in which at least an oxidizer and a coagulant are added to the contaminated to scavenge out the residual pumping industry chemistry, and pumping water from a hydration tank directly into a hopper and then from the hopper directly into a tiered retention vessel having a flat bottom wall, the tiered retention vessel configured to settle the oxidizer, the coagulant and the scavenged residual pumping industry chemistry, and then one or more filters, resulting in treated water entering the finish tank and residual materials entering the waste tank; and
adjusting (1) a selection of one or more selected types of chemicals of a plurality of different types of chemicals to be added to the contaminated water based on the at least two control parameters, (2) an amount of the selected types of chemicals to be added to the contaminated water based on the at least two control parameters, and (3) a mixture of the selected types of chemicals to be added to the contaminated water based on the at least two control parameters.

21. The method of claim 1 wherein the residual materials enter the waste tank directly from the tiered retention vessel.

22. The method of claim 1 further comprising utilizing a control panel to selectively configure the pump subsystem and the treatment subsystem.

\* \* \* \* \*